(12) United States Patent
Fouchier et al.

(10) Patent No.: US 11,782,001 B2
(45) Date of Patent: Oct. 10, 2023

(54) DISLOCATION TYPE AND DENSITY DISCRIMINATION IN SEMICONDUCTOR MATERIALS USING CATHODOLUMINESCENCE MEASUREMENTS

(71) Applicant: ATTOLIGHT AG, Lausanne (CH)

(72) Inventors: Marc Fouchier, Renens (CH); Christian Monachon, Montreux (CH)

(73) Assignee: ATTOLIGHT AG, Lausanne (CH)

( * ) Notice: Subject to any disclaimer, the term of this patent is extended or adjusted under 35 U.S.C. 154(b) by 0 days.

(21) Appl. No.: 17/537,422

(22) Filed: Nov. 29, 2021

(65) Prior Publication Data

US 2022/0178854 A1    Jun. 9, 2022

Related U.S. Application Data

(60) Provisional application No. 63/121,752, filed on Dec. 4, 2020.

(51) Int. Cl.
*G01N 23/2254* (2018.01)
*H01J 37/28* (2006.01)

(52) U.S. Cl.
CPC ..... *G01N 23/2254* (2013.01); *G01N 2223/08* (2013.01); *G01N 2223/418* (2013.01); *G01N 2223/507* (2013.01); *G01N 2223/6116* (2013.01)

(58) Field of Classification Search
CPC ............ G01N 23/2254; G01N 2223/08; H01J 2237/2808
See application file for complete search history.

(56) References Cited

U.S. PATENT DOCUMENTS

| 3,845,305 | A |   | 10/1974 | Liebl |
|---|---|---|---|---|
| 5,936,244 | A | * | 8/1999 | Yajima ................. H01J 37/228 250/310 |
| 7,674,588 | B2 |   | 3/2010 | Miller et al. |

(Continued)

FOREIGN PATENT DOCUMENTS

| FR | 2173436 A5 | 10/1973 |
|---|---|---|
| TW | 200704778 A | 2/2007 |
| TW | I699628 B | 7/2020 |
| WO | 2020225453 A2 | 11/2020 |

OTHER PUBLICATIONS

D. T. Cassidy. "Spatially-resolved and polarization-resolved photoluminescence for study of dislocations and strain in II—V materials," Mater. Sci. Eng. B91-92, pp. 2-9, 2002.

(Continued)

*Primary Examiner* — Eliza W Osenbaugh-Stewart
(74) *Attorney, Agent, or Firm* — WOMBLE BOND DICKINSON (US) LLP; Joseph Bach, Esq.

(57) ABSTRACT

A cathodoluminescence microscope and method are used to identify and classify dislocations within a semiconductor sample. At least two CL polarized images are concurrently obtained from the sample. The images are added together to obtain a total intensity image. A normalized difference of the images is taken to obtain a degree of polarization (DOP) image. The total intensity and DOP images are compared to differentiate between edge dislocations and screw dislocations within the sample. Edge dislocation density and screw dislocation density may then be calculated.

20 Claims, 5 Drawing Sheets

(56) References Cited

U.S. PATENT DOCUMENTS

| | | | |
|---|---|---|---|
| 10,677,716 B1* | 6/2020 | Hart | G01H 9/00 |
| 10,983,445 B2 | 4/2021 | Pandey et al. | |
| 2013/0335817 A1 | 12/2013 | Isobe et al. | |
| 2016/0202165 A1 | 7/2016 | Wei | |
| 2019/0103248 A1 | 4/2019 | Niu et al. | |
| 2019/0371569 A1* | 12/2019 | Bertilson | H01J 37/226 |

OTHER PUBLICATIONS

P. D. Colbourne and D. T. Cassidy. "Observation of dislocation stresses in InP using polarization-resolved photoluminescence," Appl. Phys. Lett., vol. 61, pp. 1174-1176, Apr. 1992.

M. Fouchier et al. "Characterization of Plasma Induced Damage and Strain on InP Patterns and Their Impact on uminescence," MRS Adv., No. 448, pp. 5-7, 2018.

M. Fouchier et al. "Polarized cathodoluminescence for strain measurement," Rev. Sci. Instrum. 90, 043701 (Apr. 8, 2019), pp. 043701-043701-7, https://doi.org/10.1063/1.5078506.

F. C.-P. Massabuau, et al. "Optical and structural properties of dislocations in InGaN," J. Appl. Phys. 125, 165701 (Apr. 23, 2019), pp. 165701-165701-10, https://doi.org/10.1063/1.5084330.

C. I. Osorio, T. Coenen, B. J. M. Brenny, A. Polman, and A. F. Koenderink. "Angle-Resolved Cathodoluminescence Imaging Polarimetry," ACS Photonics, vol. 3, pp. 147-154, 2015.

G. Zwirn, R. Beeri, D. Gilon and S. Akselrod, "Adaptive attenuation correction in contrast echo," Computers in Cardiology, 2005, Lyon, France, 2005, pp. 1-4, doi: 10.1109/CIC.2005.1588017.

\* cited by examiner

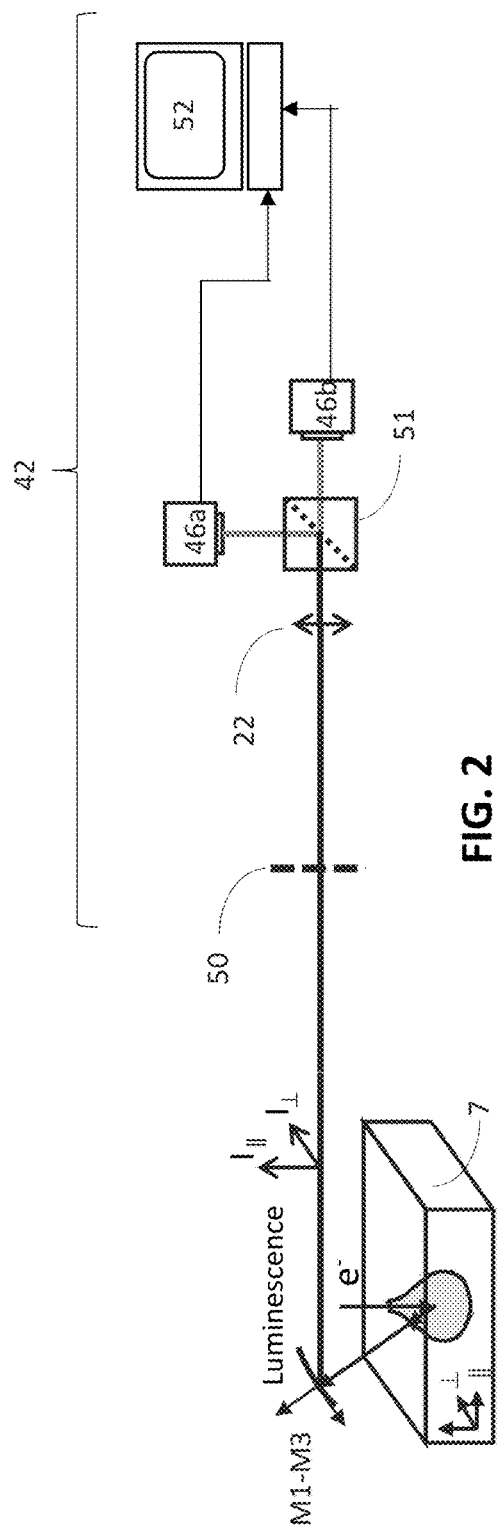
FIG. 2
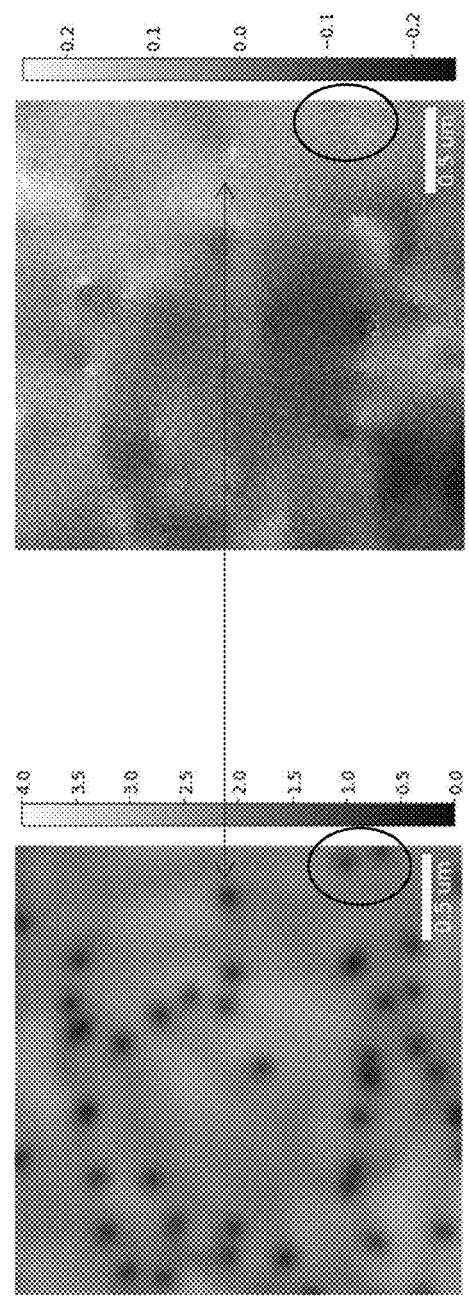
FIG. 3A
FIG. 3B

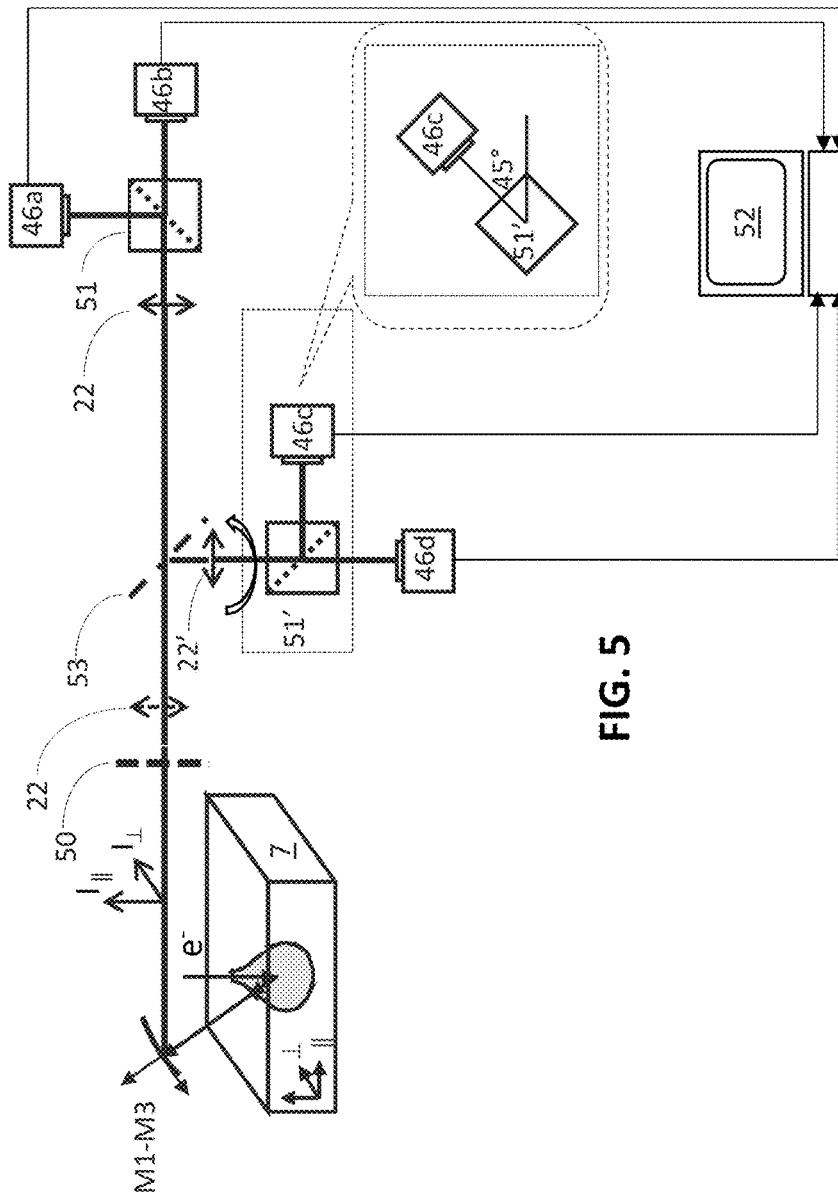
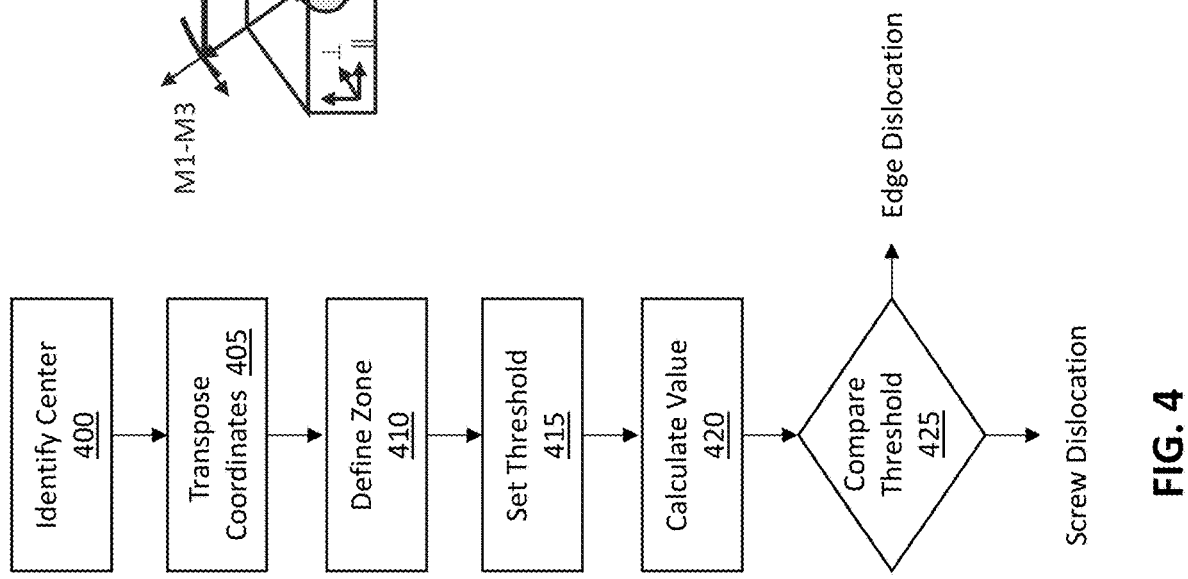
FIG. 5
FIG. 4

DISLOCATION TYPE AND DENSITY DISCRIMINATION IN SEMICONDUCTOR MATERIALS USING CATHODOLUMINESCENCE MEASUREMENTS

RELATED APPLICATIONS

This Application claims priority benefit from U.S. Provisional Application, Ser. No. 63/121,752, filed Dec. 4, 2020, the disclosure of which is incorporated herein by reference in its entirety.

TECHNICAL FIELD

The present disclosure relates to scanning cathodoluminescence microscopes and, more specifically, hardware and methods for scanning cathodoluminescence microscopes to enable discovering and classifying different defect types in semiconductor materials.

BACKGROUND

Applicant has previously disclosed a novel scanning cathodoluminescence microscopes in e.g., PCT/EP2020/063093, the disclosure of which is incorporated herein in its entirety by reference. The microscope operates based on the observation that when the beam of a scanning electron microscope (SEM) scans a sample, the electrons interact with the sample, producing various signals that can be detected and that contain information about the sample's surface topography, structure and composition. The types of signals produced by an SEM include secondary electrons (SE), back-scattered electrons (BSE), characteristic or bremsstrahlung X-rays, light, absorbed/induced current (EBAC/EBIC) and transmitted electrons (TEM). The light (defined as photons with energies ranging from 0.1 to 10 eV approximately) emitted by a specimen upon electron bombardment is called cathodoluminescence (CL). Cathodoluminescence measurements can be performed in a scanning electron microscope by scanning the highly focused electron beam probe of the electron microscope over the surface of the specimen and recording the cathodoluminescence signal intensity as a function of the electron beam position on the specimen. A cathodoluminescence map (also referred to herein as an image) may be generated, which provides higher resolution spectroscopic information than would a wide field light optical image obtained by a light microscope. For the purpose of this disclosure, it is assumed that the reader would be familiar with the above cited disclosure. For other disclosures of CL microscopes, the reader is referred to: U.S. Pat. No. 3,845,305, U.S. Pub. Nos. 2013/0335817 and 2019/0103248, and French Pat. No. 2173436.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

It is an aim of the present disclosure to enable identification and classification of dislocations within a semiconductor sample according to their type, e.g. screw, edge or mixed. Dislocations usually appear as a contrasted spot in CL images, the contrast usually being darker than the surrounding, dislocation-less material, but sometimes being brighter than the surrounding material, especially in the case of alloys, e.g. in InGaN alloys (see for instance F. Massabuau et al, 'Optical and structural properties of dislocations in InGaN', *J. Appl. Phys.* 125, 165701 (2019)). For simplicity, the spots induced by dislocations will henceforth be termed as "dark spot", but the present embodiments are not limited to dark spots, rather features visible in CL indicating the presence of a dislocation, also referred to as contrasting spots. According to disclosed aspects the observed defects are classified into edge dislocations and screw dislocations by observing strains within the sample at the locations of the defects. Indeed, strains around an edge dislocation have mostly isostatic components, by contrast with screw dislocations, which have only shear components. The strain is observed by polarizing CL emission and generating a degree of polarization (DOP) image using a normalized difference between images formed with vertically and horizontally polarized beams. The normalized difference may be obtained by calculating the ratio of the difference between the two polarized images to the sum of the two polarized images.

According to a disclosed aspect, a CL microscope is fitted with a polarizing beam splitter cube and at least two light detectors. The arrangement enables capturing two polarization complemented images of the scanned area of the samples, wherein the two images are inherently registered both spatially and temporally, thus avoiding the need for performing alignment of the images and eliminating artefacts introduced by temporal shift or delay in the acquisition of the two images.

In disclosed embodiments, cathodoluminescence microscope is provided for simultaneously generating two polarization complemented images of a scanned area of a semiconductor sample, wherein the two images are inherently registered both spatially and temporally, the microscope comprising: an electron beam column having an electron source, a magnetic lens for focusing electrons emitted from the electron source to thereby form an electron beam, and a scanner scanning the electron beam over the sample; a light objective collecting CL light emitted from the sample in response to the scanning of the electron beam and forming a light beam; an imaging section comprising a focusing lens, a polarizing beam splitter splitting the light beam into a first polarized beam and a second polarized beam, a first light detector receiving the first polarized beam and a second light detector receiving the second polarized beam; and, a controller forming the two polarization complemented images from a first signal receiving from the first light detector and a second signal receiving from the second light detector.

The imaging section may further comprise an optical filter inserted upstream of the polarizing beam splitter. Also, the microscope may further comprise a half-mirror positioned upstream of the polarizing beam splitter, wherein the focusing lens may be positioned upstream or downstream of the half-mirror; a second polarizing beam splitter is oriented to receive light reflected by the half mirror and to form a third polarized beam oriented at a 45 degrees polarization rotation angle to the first polarized beam, and a fourth polarized beam oriented at a 45 degrees polarization rotation angle to the second polarized beam; a third light detector receiving the third polarized beam; and a fourth light detector receiving the fourth polarized beam. The microscope may also include a housing affixing the polarizing beam splitter the first light detector and the second light detector at a fixed orientation with respect to each other; and a rotation mechanism rotating the housing along an axis aligned with light beam. The disclosed embodiments are advantageous in that the simultaneous acquisition of two polarized cathodoluminescence emission inherently incorporate spatial and temporal alignment of the images. The embodiments also enable differentiating between edge and screw dislocations.

According to disclosed aspects a computer program stored in a storage device is provided that, when executed by a computer causes the computer to execute steps comprising: receiving a first electrical signal corresponding to a polarized cathodoluminescence beam and a second electrical signal corresponding to polarized cathodoluminescence beam having ninety degrees polarization rotation with respect to the first electrical signal; adding the first and second electrical signals to generate an intensity image of a scanned area of a sample; taking a normalized difference of the first and second electrical signals to generate a degree of polarization (DOP) image of the area; determining coordinates of center point of each contrasting spot appearing in the intensity image; for each of the coordinates, inspecting a corresponding zone in the DOP image to determine the stress pattern in this zone fulfilling an appropriate shape or intensity criterion, then classifying it as edge or screw via a selected procedure from several available procedures. The aforementioned procedure can be a simple intensity threshold as in some materials screw dislocation simply don't appear at all in a DOP image, a local variance calculation, a pattern matching method, or a machine learning or any other AI-inspired pattern recognition method.

According to further aspects, a method of operating a cathodoluminescence microscope to detect defects within a semiconductor sample is disclosed, comprising: scanning an area of the sample with an electron beam; collecting cathodoluminescence light emitted from the area during the scanning and forming a light beam from the cathodoluminescence light; passing the light beam through a polarizer beam splitter to obtain two polarized beams having ninety degrees polarization rotation with respect to each other; using two light detectors to simultaneously generate two electrical signals corresponding to the two polarized beams; adding the two signals to form an intensity image of the area; taking a normalized difference of the two signals to form a degree of polarization (DOP) image of the area; for each contrasting spot appearing in the intensity image, inspecting a corresponding zone in the DOP image and whenever an indication of the appropriate strain field appears within the zone in the DOP image, classifying the corresponding contrasting spot as an edge dislocation.

Taking the normalized difference may comprise calculating a ratio of a difference between the first and second electrical signals to a sum of first and second electrical signals. Inspecting the DOP image may comprise calculating representative value of the DOP image within the zone and comparing the representative value to a preset threshold.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Other features and advantages of the invention will become apparent from the following description of non-limiting exemplary embodiments, with reference to the appended drawings, in which:

FIG. 2 is a simplified schematic of an image acquisition section of a cathodoluminescence microscope according to an embodiment;

FIG. 3A is an intensity image showing potential defects within the sample, while FIG. 3B is a DOP image corresponding to the area imaged in FIG. 3A;

FIG. 4 is a flow chart illustrating a process for classifying defects according to an embodiment;

FIG. 5 is a simplified schematic of an image acquisition section of a cathodoluminescence microscope according to another embodiment;

DETAILED DESCRIPTION

Figure 1:
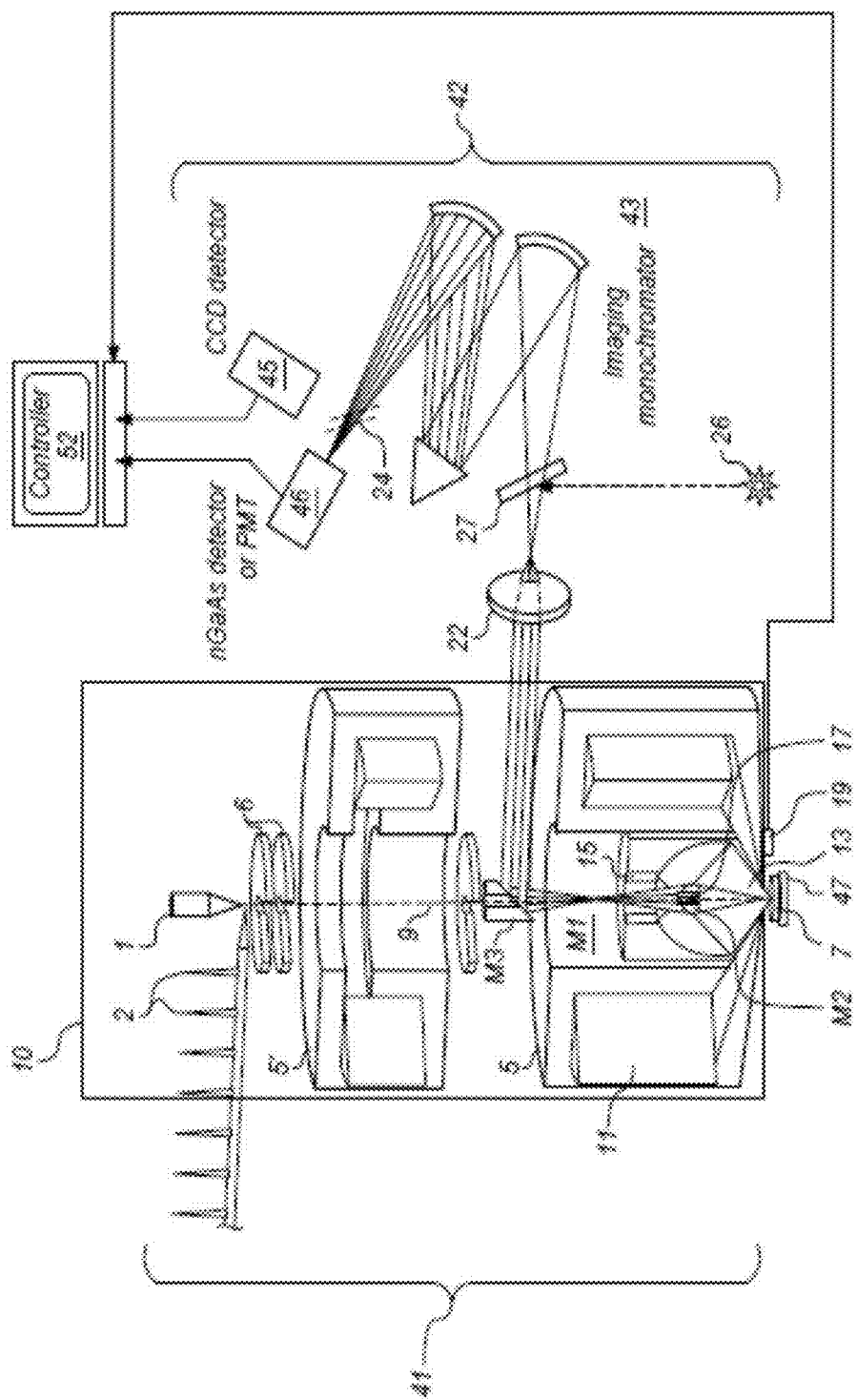
FIG. 1 is a schematic cross-sectional view of a lower portion of a cathodoluminescence scanning electron microscope for implementing embodiments disclosed herein.

Some embodiments of the present invention are described below in more detail with reference to the attached figures. Identical functional and structural elements which appear in the different drawings may be assigned the same reference numerals.

Embodiments of the inventive cathodoluminescence scanning electron microscope and methods of operation will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain features, elements or benefits will be highlighted with reference to different embodiments, but are not limited to the disclosed embodiments. That is, the features, elements and benefits disclosed herein are not limited to the embodiment within which they are described, but may be "mixed and matched" with other features and incorporated in other embodiments, even if such are not explicitly described herein.

FIG. 1 shows a lower portion of a CL microscope in cross-sectional view, which is more fully described in the above-cited PCT/EP2020/063093. As illustrated in FIG. 1, the microscope generally includes an electron column 41 that is housed within vacuum enclosure 10, and imaging section 42, which is in atmospheric environment. The integrated microscope shown in FIG. 1 can generate an electron beam image, a light beam image, a cathodoluminescence (CL) image, and a CL spectrographic image. The imaged CL emissions can be correlated to the structure and quality of the sample's material at the nano-scale. The CL data can reveal material stress, impurities, crystallographic, and subsurface defects that are not visible using other imaging modes. Importantly, the CL imaging is a non-destructive method of inspecting a sample.

The electron column includes an electron source 1, such as a thermionic or field emission source, that emits electrons. The emitted electrons are made into electron beam 9 by the various particle-optics elements, such as electromagnetic lens 5', electromagnetic objective 5, and aperture disks (sometimes referred to as stops) 6. Note that any of the aperture disks 6 may function as an electrostatic lens by application of potential thereto. In a known manner, coils 11 are provided to generate a magnetic field, in this figure a substantially horizontal magnetic field at the level of the optical axis z of the electromagnetic objective lens 5. Most of the magnetic field may be located at the level of an output or exit aperture 13, or instead it could be outside of that region between the lens and the specimen.

The purpose of the magnetic field is to generate a converging electron beam 9 which can be focused on to the surface of the sample 7. In this example, the electron beam 9, which is generated by the electron emitter 1, propagates from the top of the figure downwards. The electron beam span may be modified by a condenser arrangement, such as a lens 5', so that it can either diverge, be collimated or converge. The condenser may be placed below the electron emitter. The electron beam typically has a width in the range of a few millimetres, for example between 2 and 3 mm.

The lens 5 has a hollow interior along its optical axis, so that the electron beam 9 can pass through. The hollow part (passage or gap) is wide enough so that light emitted by or reflected from the sample 7, can also pass through without much obstruction. Since it is preferable to keep the output aperture 13 of the electromagnetic objective lens 5 as small as possible in order to keep good electron optical performance, it is preferable to build the system so that the working distance stays small.

As can be seen, a reflective objective is provided within the electromagnetic objective lens 5 for imaging the surface of the sample 7. In this example a Schwarzschild reflective objective is used. A Schwarzschild objective is a two mirror reflective objective, which is rotationally symmetric about the optical axis z (essentially coinciding with the path of the electron beam), is aplanatic and infinity-corrected. The electromagnetic objective lens 5 and the reflective objective may have the same focal plane. The reflective objective within the electromagnetic objective 5 comprises a first mirror M1, also referred to as the primary mirror, which in this example is spherical and concave, and a second mirror M2 also referred to as the secondary mirror, which in this example is spherical and convex. The diameter of the first mirror M1 is larger than the diameter of the second mirror M2. The first mirror M1 is located above the second mirror M2 and is arranged to reflect the light coming from the sample as a result of the electron beam 9 hitting the surface of the sample 7, and to direct the light towards the second mirror M2 placed between the sample and the first mirror M1. The second mirror M2 is arranged to redirect the light along the optical axis of the electromagnetic objective (i.e., upwards), and a third mirror, M3, which in this example is planar, is arranged to redirect the light beam towards an output. In this example the third mirror M3 has a 45° angle with respect to the electron beam 9 axis and is used to redirect the light out of the vacuum enclosure 10. All the three mirrors M1, M2 and M3 have an aperture or opening along the electron beam path so that the electron beam is not obstructed.

In the light imaging section 42, the light reflected by mirror M3 is focused by lens 22 onto an imaging monochromator 43. In this example, two imagers are provided, a CCD camera 45 and a detector 46, such as an InGaAs or PMT detector. If mirror 24 is a half mirror, then both imagers can be operated simultaneously. Conversely, mirror 24 may be a flip mirror, enabling operating one imager at a time. With this arrangement, detector 46 can be used to detect light intensity of a specified wavelength, while CCD camera may be used to detect light intensity at several wavelengths simultaneously.

The CL microscope has been used to inspect semiconductors to detect defects. However, in many cases the number of defects is large and includes various different types of defects. To assist in the inspection of the material, it would be beneficial to be able to identify and possibly classify the different types of defects appearing in the CL images, since some types of defects may be catastrophic to the device, while other types may not affect device performance. Therefore, determining the types of defects is crucial to determining the quality of the inspected sample.

It has also been observed that a hydrostatic pressure in the sample would produce a shift in the CL emission energy spectrum, while a non-hydrostatic strain may cause a broadening of the spectrum, but not a shift in the peak of the energy spectrum. These phenomena have been studied using photoluminescence, wherein light beam (e.g., laser beam) is scanned on the sample and light emitted from the sample is collected and analysed. Also, degree of polarization (DOP) technique has been used to measure strain within the sample by inserting a polarizer in the light collection path and rotating the polarizer to take CL images at horizontal and vertical polarizations. The DOP is then obtained by DOP= $(I\perp - I_\parallel)/(I\perp + I_\parallel)$. Since strain within the sample would affect the polarization of the emitted light, the DOP image would identify locations of strain within the sample.

In several semiconductor materials, such as Gallium Nitride (GaN), Silicon Carbide (SiC), Gallium Arsenide (GaAs) and Indium Phosphide (InP), dislocations are linear defects with a major impact on the performance of the devices. Conversely, some other types of defects may not be detrimental to the device's performance. For example, one of the major differences between screw and edge dislocations is that the screw type has a Burgers vector parallel to the dislocation line, meaning that it exerts pure shear on the surrounding material, so that the only stress variation is perpendicular to the material's surface, while the edge type has a Burgers vector perpendicular to its axis, meaning that it creates around its core a strain field which is perpendicular to the dislocation line and parallel to the material's surface.

Dislocations within a sample would most often act as a recombination site and therefore a non-radiative point within the semiconductor sample. Consequently, each defect appears as a dark spot in the CL intensity image, except in some cases, where they appear as bright spot. Conversely, as confirmed by the inventors in various experimentations, the DOP image would show grey level variation (typically darker on one side of the dislocation core, and brighter on the other), only in the locations of dislocations that induce strain in the sample that can be spotted in the DOP image, i.e. edge dislocations in the example shown in FIGS. 3A and 3B. Thus, the inventors have discovered that CL DOP images can be used to map edge dislocations, as separate from other dislocations (e.g., screw dislocations) that generate a different strain field to which DOP is either not sensitive, or sensitive in a way that allows it to be clearly differentiated from edge dislocations. In the example FIGS. 3A and 3B, pure screw dislocations are not visible at all in the DOP image.

Thus, according to a disclosed aspect, a method for determining edge dislocation density is provided comprising: scanning an area of a semiconductor sample with an electron beam, collecting CL light emitted from the sample and forming a light beam from the collected light, passing the light beam through a polarizer and directing the light beam to a detector and generating a horizontally polarized image of the area and a vertically polarized image of the area, obtaining a normalized difference of the horizontally polarized image and vertically polarized image to thereby form a degree of polarization (DOP) image, calculating the edge dislocation density by determining the density of corresponding features appearing in the DOP image. The normalized difference may be obtained by calculating the ratio of the difference between the two polarized images to the sum of the two polarized images.

Moreover, by the experimentation the inventors have determined that further information about the defects can be obtained by comparison of a CL intensity image and DOP image. Such comparison can enable determining defect densities discriminated by type of defects. That is, by calculating the density of dark spots in the intensity image the overall defect density is obtained, by calculating the density of these same dark spots that have a corresponding feature in the DOP image the density of edge dislocations can be obtained, and by taking the difference between the overall and edge dislocation densities the defect density of screw dislocations can be obtained. Stated another way, the difference in features between the intensity image and the DOP image provides a map of the screw dislocations which can be used to determine the screw dislocation density.

Thus, a method for determining edge dislocation density and screw dislocation density is provided comprising: scanning an area of a semiconductor sample with an electron beam, collecting CL light emitted from the sample and forming a non-polarized light beam from the collected light, directing at least part of the non-polarized light beam to a detector and generating an intensity image of the area, calculating overall defect density by determining the density of dark spots appearing in the intensity image, passing at least part of the non-polarized light beam through a polarizer to generate a polarized beam and directing the polarized beam to a detector and generating a horizontally polarized image of the area and a vertically polarized image of the area, obtaining a normalized difference of the horizontally polarized image and vertically polarized image to thereby form a degree of polarization (DOP) image, calculating the edge dislocation density by determining the density of dark spots in the intensity image that are also appearing in the DOP image, and calculating screw dislocation density by subtracting the edge dislocation density from the overall defect density.

According to further aspects, a method for generating a screw dislocation map is provided, comprising: scanning an area of a semiconductor sample with an electron beam, collecting CL light emitted from the sample and forming a non-polarized light beam from the collected light, directing at least part of the non-polarized light beam to a detector and generating an intensity image of the area, passing at least part of the non-polarized light beam through a polarizer to generate a polarized beam and directing the polarized beam to a detector and generating a horizontally polarized image of the area and a vertically polarized image of the area, obtaining a normalized difference of the horizontally polarized image and vertically polarized image to thereby form a degree of polarization (DOP) image, identifying all spots that appear as a contrast in corresponding coordinates in the intensity image and the DOP image to thereby obtain a mapping of edge dislocations. Alternatively, the intensity image is generated by simply summing the horizontally polarized image of the area and the vertically polarized image of the area.

An important part of the analysis described above is proper alignment of the horizontally and vertically polarized images, both is space and time. The alignment in space is important in order to enable differentiating the defects according to the intensity levels of pixels within the images. Also, the time difference between the images should be minimized, or preferably eliminated, in order to avoid potential issues such as stage drift and the effect of sample charging on the emitted light intensity. Accordingly, the image acquisition part 42 of the microscope shown in FIG. 1 has been modified, as will be detailed below.

FIG. 2 is a simplified schematic illustrating an embodiment of an apparatus for obtaining a CL DOP image with inherent alignment of the horizontally and vertically polarized images. That is, the embodiment illustrated in FIG. 2 simultaneously generates two polarization complemented images of the scanned area of the sample, wherein the two images are inherently registered both spatially and temporally. Elements in FIG. 2 that are the same as those in FIG. 1 have the same reference characters. The sample 7 is illuminated by a scanning electron beam e. The CL emission is collected by mirrors M1-M3 and is directed towards the imaging section 42. After the beam passes the focusing lens 22 it is split into a horizontally polarized beam and a vertically polarized beam by the polarizing beam splitter (PBS) cube 51. In the illustrated embodiment the PBS is designed to split the unpolarized beam at a 50/50 ratio into reflected S-polarized and transmitted P-polarized beams. Each of light detectors 46*a* and 46*b* is a point detector, such as a photomultiplier tube (PMT), a photodiode, etc., and detects one of the S-polarized and P-polarized beams. The signal from each of the detectors is sent to the controller 52 (in one example, the signals are input to a scanning card within the controller). In this manner, the P and S-polarized signals for each pixel are recorded simultaneously by the controller, so that they are inherently aligned in time and space. The controller 52 may then operate to manipulate the signals according to any of the method disclosed herein. In particular, the controller is operable to add the signals from both detectors 46*a* and 46*b* to generate a sum image indicating overall CL intensity image, and the controller is operable to obtain a normalized difference of the two signals to thereby generate the DOP image.

FIG. 3A is a CL intensity image obtained by summing the signals from the two detectors 46*a* and 46*b*. FIG. 3B is a DOP image obtained by taking the normalized difference of the signals from the two detectors. In FIG. 3A each dark spot corresponds to a non-emitting site, thus indicating a defect. However, from the intensity image of FIG. 3A one cannot distinguish between the different types of defects within the image. The DOP image of FIG. 3B shows variation of grey scale at each location of strain, thus indicating a defect site generating the strain. Note, however, that the two defects circled in FIG. 3A do not have corresponding grey scale disturbance or variation in the DOP image of FIG. 3B. Therefore, it is highly likely that these two spots correspond to screw dislocations.

To differentiate the screw dislocations from the edge dislocations, the following processes may be employed, as detailed with reference to FIG. 4, which illustrates the non-ordered steps of the process. In step 400, the intensity image is inspected to identify all of the dark spots (dislocations) and calculate the coordinates of the center of each spot. In step 405 the coordinates are transposed to the coordinates in the DOP image and in step 410 a zone around each of the centers in the DOP image is determined. The zone identifies the area that is considered relevant to determine the dislocation at the identified center. The size of the zone can be determined by experience, as the smaller the zone the more discriminating it would be among closely clustered defects, but also the more likely it would be to miss pixels corresponding to the defect. Conversely, the larger the zone is the more likely it would be to include pixels belonging to a neighboring defect.

In step 415 a threshold is set; however, the threshold may be set at any time and may be used for multiple inspection of multiple samples. The threshold would depend on the analysis that is performed in step 420, which is referred to generally as calculating the representative value for each zone in the DOP image. This may be done in various ways. For example, in one embodiment the local variance of the signal (i.e., grey level) within each defined zone is calculated as the representative value. According to another embodiment, a fitting equation is applied to the grey level within the zone and the equation fit is set as the representative value. Examples of curve fitting can be found in: Zwirn, G. & Beeri, Ronen & Gilon, Dan & Akselrod, S., Adaptive Attenuation Correction in Contrast Echo. Computers in Cardiology. 32. 1-4. 10.1109/CIC.2005.1588017 (2005). According to yet another example, a comparison is made to a stored database using, e.g., principal component analysis, or similar AI-based pattern recognition algorithms.

At step 425 the results of the analysis for each defect are compared to the threshold to determine whether the defect is a screw or edge dislocation. For example, in step 425 if the variance is below the set threshold, it is determined that the defect is a screw dislocation, since it means that there's no sufficient grey scale variance within the zone to indicate a defect in the DOP image. Similarly, if the equation fit has an amplitude lower than the set threshold, the defect is identified as a screw dislocation. When using comparison to a pre-stored database, if the zone does not correspond to the database to an extent above the threshold, the defect is identified as a screw dislocation. Of course, for each of these analyses, if the comparison to the threshold does not result in a determination of screw dislocation, then the defect is identified an as edge or mixed dislocation. In another embodiment, several thresholds can be defined to identify several types of dislocation from a pure edge character to mixed to pure screw. Also, for each of the above analyses a further refinement may be achieved by comparison to a calculated "background" grey scale value. For example, the background grey scale value may enhance the analysis of variance within the zone. If the variance is not sufficiently large from the background value, then it may simply signify a screw dislocation or an image noise rather than an edge dislocation.

To illustrate, the double-headed arrow straddling FIGS. 3A and 3B points to a dark spot in FIG. 3A, with the arrowhead in FIG. 3B pointing to the corresponding location in FIG. 3B, i.e., the zone about the corresponding coordinate. The zone in FIG. 3B appears to have a dark area and a bright area. Consequently, the gray level variance within the zone would be relatively high, as compared to the area indicated by the oval in FIG. 3B. Such a variance should be above the threshold, so that the defect would be classified as an edge dislocation. Conversely, since the variance in the area indicated by the oval would fall below the variance, the corresponding dark spots in FIG. 3A would be classified as screw dislocations.

Thus, a method for identifying and discriminating defects in a semiconductor sample is provided, comprising: irradiating an area of the sample with an electron beam; collecting light emitted from the area to thereby generate a light beam; passing the light beam through a polarizer to thereby generate a first polarized beam and a second polarized beam; directing the first polarized beam to a first detector and directing the second polarized beam to a second detector; generating an intensity image by adding output signals of the first and second detectors; generating a polarization image by obtaining a normalized difference of the output signals of the first and second detectors; generating a list of coordinates, each coordinate identifying the center of each dark spot appearing in the intensity image; for each coordinate, defining a defect zone in the polarization image; for each defect zone calculating a representative value; comparing the representative value of each defect zone to a preset threshold and categorize the zone as an edge dislocation or screw dislocation depending on whether the representative value is below or above the preset threshold.

Referring back to FIG. 2, a wavelength filter 50 (i.e., an optical filter such as, e.g., a bandpass or monochromatic filter) may be optionally inserted in the beam's path to improve the signal to noise ratio. Specifically, to generate the DOP images of the embodiments disclosed herein, the emission of interest is the band edge emission. Therefore, a wavelength filter 50 may be used to reject other emissions, e.g., emissions from the defect bands.

Figure 6:
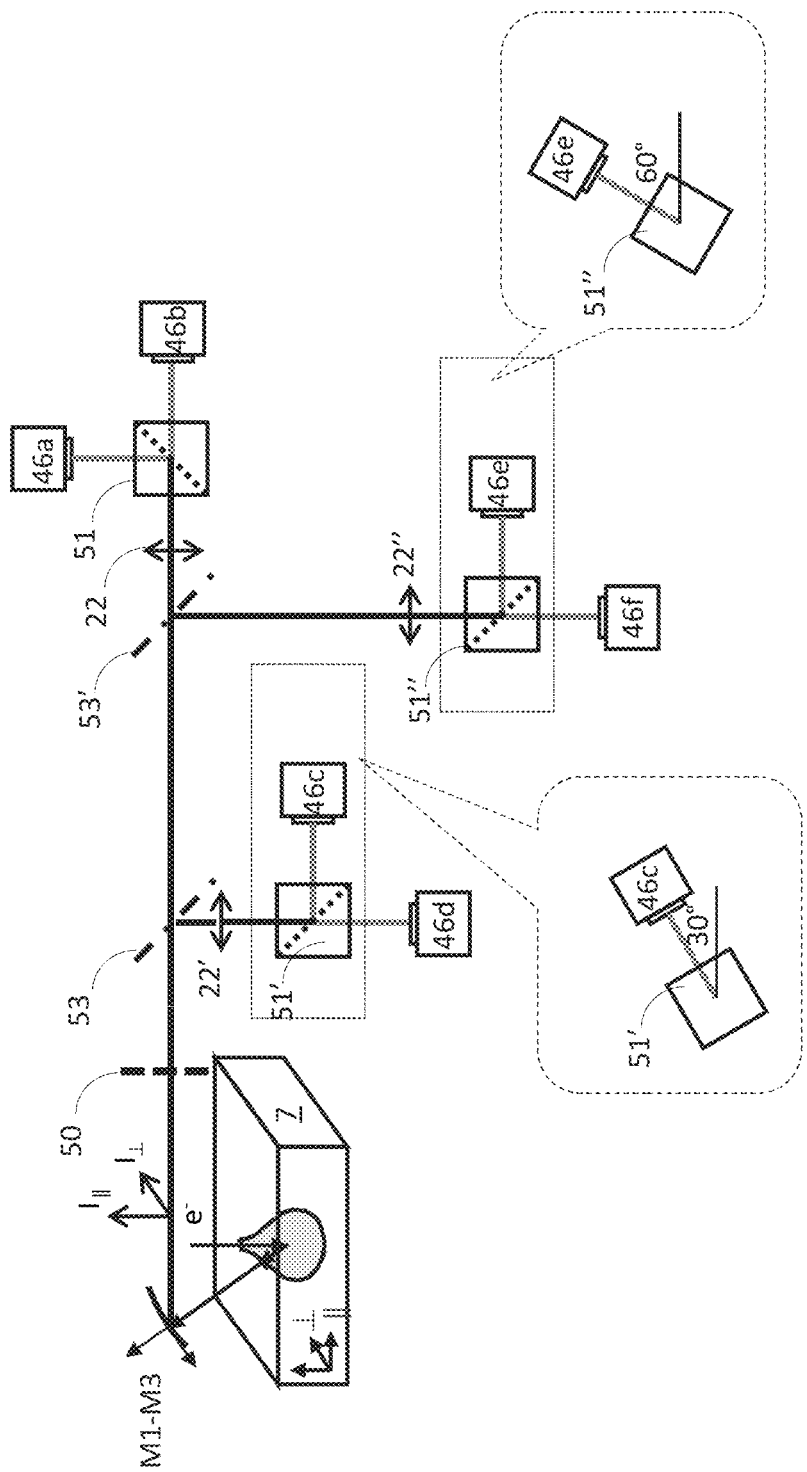
FIG. 6 is schematic of an image acquisition section of a cathodoluminescence microscope according to yet another embodiment.

The embodiments disclosed so far operate well when the sample is aligned properly, such that the Burgers vector of the dislocations generate polarization that is aligned with the orientation of the PBS cube. To ensure that other dislocations that are not so aligned may also be detected, a second independent measurement can be made by rotating the sample, e.g., by a 45° angle. However, as noted above, with the CL measurement even a small spatial drift, such as of shift of one pixel between the measurements may void the results of the entire measurement. Also, using rotation inherently means that the images would not be temporally concurrent, which may also affect the measurement. FIGS. 5 and 6 illustrate embodiments that avoid these issues.

The embodiment of FIG. 5 utilizes the CL microscope of FIG. 2, with additional optical elements. Specifically, a non-polarizing beam splitter 53 (here a half-mirror with 50% transmission and 50% reflection) is inserted in the light beam path upstream of the first PBS cube 51. Half of the light beam then passes through the non-polarizing beam splitter 53 and is handled as disclosed with respect to the embodiment of FIG. 2. The other half is reflected towards a second PBS cube 51' which is rotated at 45° with respect to the first PBS cube 51. This rotation is illustrated in the callout in FIG. 5, depicting that detector 45c receives a beam that is 45° polarization angle rotated with respect to the beam received by the first detector 46a. In essence, the second PBS cube 51' is rotated at a 45° about the beam path, as exemplified by the curved arrow, such that detector 46c is shifted into or out of the plane of the page. Similarly, the polarization angle of the beam received by detector 46d is rotated 45° polarization angle with respect to the polarization of the beam received by detector 46b.

With the arrangement of FIG. 5, four signals are received by the controller 52, which may use these signals as follows. The controller 52 may generate the intensity image by adding the signals of any two detectors paired with the same PBS cube, e.g., either adding the signals of detectors 46a and 46b or adding the signals of detectors 46c and 46d. Alternatively, the controller 52 may generate the intensity image by adding the signals of all four detectors. The controller may then generate two DOP images: one consisting of the normalized difference of the signals from detectors 46a and 46b, and one consisting of the normalized difference of the signals from detectors 46c and 46d. The process as outlined in, e.g., FIG. 4 may then be repeated for each of the two DOP images.

Incidentally, in the embodiment of FIG. 5 two focusing lenses 22 and 22' are utilized, one paired with each of the PBS cubes. Such an arrangement provides design flexibility, especially with respect to the placing of the PBS cubes and detectors. Also, it allows for a shorter focal length for each half-beam path, thus enabling wide field of view images. However, alternatively, a single focusing lens may be used, which is inserted upstream of the non-polarizing beam splitter 53, as illustrated in dotted double-head arrow. With such an arrangement, the beam path to all of the detectors must be of identical length.

FIG. 6 illustrates a further embodiment wherein six detectors are used in order to generate DOP images at three different polarization rotations. In this embodiment two non-polarizing beam splitters 53 and 53' are inserted in the light beam path, thereby generating three different light paths. In this embodiment the first non-polarizing beam splitter 53 may be more transmissive than reflective, e.g., 55%-70% transmissive, i.e., a transmissive mirror, rather than being a strict half-mirror. In this respect, a transmissive mirror may refer to a mirror that transmits any amount of light, while a half mirror is a special case of a transmissive mirror that transmit half of the light. Conversely, the second non-polarizing beam splitter 53' may be a 50/50 half-mirror. As exemplified in the callouts, the second and third PBS cubes 51' and 51" are rotated at a 30° and 60° angles with respect to the orientation of the first PBS cube 51. As with the embodiment of FIG. 5, the signals from any pair of detectors may be added to form the total intensity image, or the signal from all of the detectors may be used to form the intensity image. Also, the controller may generate three DOP images by the normalized different of the signals of each pair of detectors, i.e., one DOP from detectors 46a and 46b, one DOP image from detectors 46c and 46d, and one DOP image from detectors 46e and 46f. The process outline in, e.g., FIG. 4 may be repeated for each of the three DOP images.

Figure 7:
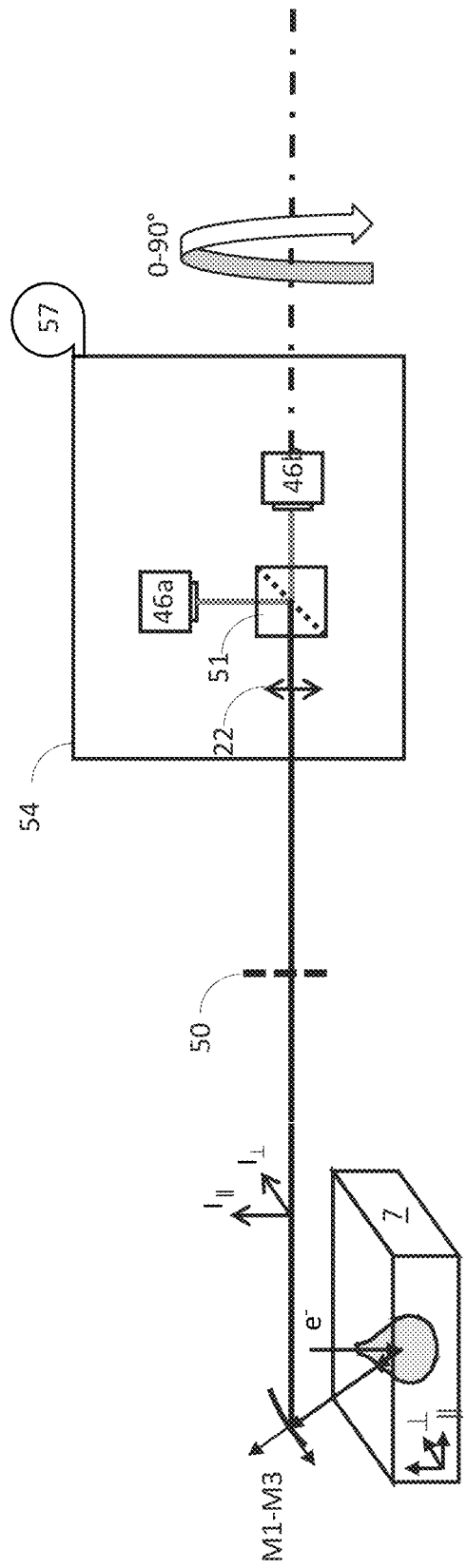
FIG. 7 is a schematic of an image acquisition section of a cathodoluminescence microscope according to a further embodiment.

As already indicated, the accuracy of the processes disclosed herein relies on a perfect spatial and temporal alignment of the images. Additionally, the accuracy can be improved by exact calibration of each two paired light detectors. That is, a given light intensity should result in identical electrical signal output from each of the paired light detectors. Such calibration may be done electronically by normalizing the signals from the paired detectors. Additionally, FIG. 7 illustrates an example enabling accurate calibration of paired detectors. The features of the embodiment of FIG. 7 are shown with respect to the two paired detectors of FIG. 2, but the features are applicable to any two paired detectors in any of the disclosed embodiments.

In FIG. 7 a housing 54 is provided wherein the focusing lens 22, the PBS cube 51 and the paired detectors 46a and 46b are affixed, such that the spatial relationship among these elements is fixed. A rotation mechanism 55 rotates the housing 54 about a rotation axis that coincides with the light beam path, as exemplified by the curved arrow. Since the optical elements are affixed with fixed spatial orientation within the housing, that spatial orientation does not change during the rotation. Thus, by rotating the housing and checking the output signal from the detectors and paired detectors can be accurately calibrated.

As can be understood from the above, disclosed embodiments provide a cathodoluminescence (CL) electron microscope, comprising: a vacuum enclosure; an electron source positioned at a top position within the vacuum enclosure; an electromagnetic objective lens positioned at a bottom position within the vacuum enclosure, the electromagnetic objective lens including a housing having an entry aperture at top surface thereof and an exit aperture at bottom thereof; an electromagnetic coil radially positioned within the housing; a light objective positioned within the housing and comprising a concave mirror having a first axial aperture and a convex mirror having a second axial aperture; an electron beam deflector positioned within the housing and comprising a first set of deflectors and a second set of deflectors cooperating to scan the electron beam over a specimen; a deflector mirror receiving light collected by the light objective and deflecting the light towards outside of the vacuum enclosure; an imaging section positioned outside the vacuum enclosure and comprising a focusing lens, a polarizing beam splitter splitting the light beam into a first polarized beam and a second polarized beam, a first light detector receiving the first polarized beam and a second light detector receiving the second polarized beam; and a controller forming the two polarization complemented images from a first signal receiving from the first light detector and a second signal receiving from the second light detector.

The embodiments disclosed provide a method for identifying defects in a semiconductor sample, comprising: scanning an area of the sample with an electron beam; collecting cathodoluminescence light emission from the sample and generating therefrom a light beam; passing the light beam through a polarizing beam splitter (PBS) to generate a vertically polarized beam and a horizontally polarized beam; using a first light detector to generate a first electrical signal corresponding to the vertically polarized beam and a second light detector to generate a second electrical signal corresponding to the horizontally polarized beam; adding the first and second electrical signals to generate an intensity image of the area; taking a normalized difference of the first and second electrical signals to generate a degree of polarization (DOP) image; comparing the intensity image to the DOP image to identify the defects within the area. In the method, the normalized difference may be obtained by calculating the ratio of the difference between the first and second electrical signals to the sum of first and second electrical signals.

Also, a method of operating a cathodoluminescence microscope is provided, comprising: energizing an electron emitter to thereby generate an electron beam; energizing an electromagnetic objective lens to thereby generate a magnetic field for focusing the electron beam to a focal plane of the electromagnetic objective lens; energizing a scanner to scan the electron beam over an area of a semiconductor sample; collecting cathodoluminescence light from the sample and forming a light beam therefrom; passing the light beam through a polarizing beam splitter (PBS) to generate a vertically polarized beam and a horizontally polarized beam; using a first light detector to generate a first electrical signal corresponding to the vertically polarized beam and a second light detector to generate a second electrical signal corresponding to the horizontally polarized beam; adding the first and second electrical signals to generate an intensity image of the area; taking a normalized difference of the first and second electrical signals to generate a degree of polarization (DOP) image; determining coordinates of center point of each dark spot appearing in the intensity image; for each of the coordinates, inspecting a corresponding zone in the DOP image to determine whether an indication of stress appears within the zone; and for each indication of stress classifying the corresponding dark spot as an edge dislocation.

The method disclosed herein may be implemented by the controller 52, which may be a special purpose computer or a general computer, such as a PC, executing a program embodying the method. The disclosed methods may also be implemented as a computer program stored in a storage device that, when executed by a computer causes the computer to execute steps implementing the method. For example, the steps may include receiving a first electrical signal corresponding to a vertically polarized CL beam and a second electrical signal corresponding to the horizontally polarized CL beam; adding the first and second electrical signals to generate an intensity image of a scanned area of a sample; taking a normalized difference of the first and second electrical signals to generate a degree of polarization (DOP) image; determining coordinates of center point of each contrasting spot appearing in the intensity image; for each of the coordinates, inspecting a corresponding zone in the DOP image to determine whether an indication of stress appears within the zone; and for each indication of stress classifying the corresponding contrasting spot as an edge dislocation.

While the invention has been illustrated and described in detail in the drawings and foregoing description, such illustrations and descriptions are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A cathodoluminescence microscope for simultaneously generating two polarization complemented images of a scanned area of a semiconductor sample, wherein the two images are inherently registered both spatially and temporally, comprising:
    an electron beam column having an electron source, a magnetic lens for focusing electrons emitted from the electron source to thereby form an electron beam, and a scanner scanning the electron beam over the sample;
    a light objective collecting light emitted from the sample in response to the scanning of the electron beam and forming a light beam;
    an imaging section comprising a focusing lens, a polarizing beam splitter splitting the light beam into a first polarized beam and a second polarized beam, a first light detector receiving the first polarized beam and a second light detector receiving the second polarized beam; and,
    a controller forming the two polarization complemented images from a first signal receiving from the first light detector and a second signal receiving from the second light detector.

2. The cathodoluminescence microscope of claim 1, wherein the imaging section further comprises an optical filter inserted upstream of the polarizing beam splitter.

3. The cathodoluminescence microscope of claim 1, further comprising: a half-mirror positioned upstream of the polarizing beam splitter; a second polarizing beam splitter oriented to receive light reflected by the half mirror and to form a third polarized beam oriented at a 45 degrees polarization rotation angle to the first polarized beam, and a fourth polarized beam oriented at a 45 degrees polarization rotation angle to the second polarized beam; a third light detector receiving the third polarized beam; and a fourth light detector receiving the fourth polarized beam.

4. The cathodoluminescence microscope of claim 3, wherein the focusing lens is positioned between the half mirror and the polarizing beam splitter; and further comprising a second focusing lens positioned between the half-mirror and the second polarizing beam splitter.

5. The cathodoluminescence microscope of claim 3, wherein the focusing lens is positioned upstream of the half mirror.

6. The cathodoluminescence microscope of claim 1, further comprising: a first transmissive-mirror positioned upstream of the polarizing beam splitter; a second polarizing beam splitter oriented to receive light reflected by the first transmissive-mirror and to form a third polarized beam oriented at a 30 degrees angle to the first polarized beam, and a fourth polarized beam oriented at a 30 degrees angle to the second polarized beam; a third light detector receiving the third polarized beam; and a fourth light detector receiving the fourth polarized beam; and, a second transmissive-mirror; a third polarizing beam splitter oriented to receive light reflected by the second transmissive-mirror and to form a fifth polarized beam oriented at a 60 degrees angle to the first polarized beam, and a sixth polarized beam oriented at a 60 degrees angle to the second polarized beam; a fifth light detector receiving the fifth polarized beam; and a sixth light detector receiving the sixth polarized beam.

7. The cathodoluminescence microscope of claim 6, wherein the first transmissive mirror comprises a 55%-70% transmissive mirror.

8. The cathodoluminescence microscope of claim 1, further comprising a housing affixing the polarizing beam splitter the first light detector and the second light detector at a fixed orientation with respect to each other; and a rotation mechanism rotating the housing along an axis aligned with light beam.

9. A computer program stored in a storage device that, when executed by a computer causes the computer to execute steps implementing the method comprising:
    receiving a first electrical signal corresponding to a polarized cathodoluminescence beam and a second electrical signal corresponding to the polarized cathodoluminescence beam and having ninety degrees polarization rotation with respect to the first electrical signal; adding the first and second electrical signals to generate an intensity image of a scanned area of a sample; taking a normalized difference of the first and second electrical signals to generate a degree of polarization (DOP) image of the area; determining coordinates of center point of each contrasted spot appearing in the intensity image; for each of the coordinates, inspecting a corresponding zone in the DOP image to determine whether an indication of stress appears within the zone; and for each indication of stress classifying the corresponding contrasting spot as an edge dislocation.

10. The computer program of claim 9, wherein taking the normalized difference comprises calculating a ratio of a difference between the first and second electrical signals to a sum of first and second electrical signals.

11. The computer program of claim 10, wherein the inspecting step comprises: calculating representative value of the DOP image within the zone and the determining step comprises comparing the representative value to a preset threshold.

12. The computer program of claim 11, wherein calculating the representative value comprises calculating variance of the DOP image within the zone and the determining step comprises comparing the variance to a preset threshold.

13. The computer program of claim 11, wherein calculating the representative value comprises applying a fitting equation to grey level values within the zone.

14. A method of operating a cathodoluminescence microscope to detect defects within a semiconductor sample, comprising:
scanning an area of the sample with an electron beam;
collecting cathodoluminescence light emitted from the area during the scanning and forming a light beam from the cathodoluminescence light;
passing the light beam through a polarizer beam splitter to obtain two polarized beams having ninety degrees polarization rotation with respect to each other;
using two light detectors to simultaneously generate two electrical signals corresponding to the two polarized beams;
adding the two signals to form an intensity image of the area;
taking a normalized difference of the two signals to form a degree of polarization (DOP) image of the area;
for each contrasting spot appearing in the intensity image, inspecting a corresponding zone in the DOP image and when an indication of stress appears within the zone in the DOP image, classifying the corresponding contrasting spot as an edge dislocation.

15. The method of claim 14, wherein taking a normalized difference comprises calculating a ratio of the difference of the two signals to the sum of the two signals.

16. The method of claim 15, wherein the inspecting comprises calculating representative value of the DOP image within the zone and comparing the representative value to a preset threshold.

17. The method of claim 16, wherein calculating representative value comprises calculating variance of the DOP image within the zone.

18. The method of claim 16, wherein calculating representative value comprises applying a fitting equation to grey level values within the zone.

19. The method of claim 16, wherein calculating representative value comprises using principal component analysis to compare the DOP image to a stored reference image.

20. The method of claim 14, further comprising filtering the light beam prior to passing the light beam through the polarizer beam splitter.

* * * * *